(12) United States Patent
Golden et al.

(10) Patent No.: US 6,706,857 B2
(45) Date of Patent: Mar. 16, 2004

(54) RECOVERY OF OLEFIN MONOMERS

(75) Inventors: Timothy Christopher Golden, Allentown, PA (US); Edward Landis Weist, Jr., Macungie, PA (US); Charles Henry Johnson, Coplay, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/385,947

(22) Filed: Mar. 11, 2003

(65) Prior Publication Data

US 2003/0176634 A1 Sep. 18, 2003

Related U.S. Application Data

(63) Continuation of application No. 09/976,525, filed on Oct. 12, 2001, now abandoned.

(51) Int. Cl.⁷ .............................. C08F 6/00; B01D 53/47
(52) U.S. Cl. .......................... 528/482; 95/98; 95/100; 95/144; 96/108; 96/143
(58) Field of Search .............................. 528/482; 95/98, 95/100, 144; 96/108, 143

(56) References Cited

U.S. PATENT DOCUMENTS

| | | |
|---|---|---|
| 3,430,418 A | 3/1969 | Wagner |
| 4,498,910 A | 2/1985 | Benkmann |
| 4,781,896 A | 11/1988 | Willmore et al. |
| 4,849,537 A | 7/1989 | Ramachandran et al. |
| 5,245,099 A | 9/1993 | Mitariten |
| 5,322,927 A | 6/1994 | Ramachandran et al. |
| 5,741,350 A | 4/1998 | Rowles et al. |
| 5,769,927 A | 6/1998 | Gottschlich et al. |

FOREIGN PATENT DOCUMENTS

EP  0 888 815  1/1999

OTHER PUBLICATIONS

USSN 09/976,398—Zwilling, at al.—filed: Oct. 21, 2001—cited in parent application.

*Primary Examiner*—Fred Teskin
(74) *Attorney, Agent, or Firm*—Willard Jones, II

(57) ABSTRACT

In a process for the production of a polyolefin, an olefin monomer is polymerised said polyolefin and residual monomer is recovered. A gas stream comprising the monomer and nitrogen is subjected to a PSA process in which said monomer is adsorbed on a periodically regenerated silica gel or alumina adsorbent to recover a purified gas stream containing said olefin and a nitrogen rich stream containing no less than 99% nitrogen and containing no less than 50% of the nitrogen content of the gas feed to the PSA process.

11 Claims, 3 Drawing Sheets

N2 RECOVERY VS. SURFACE AREA OF ADSORBENT

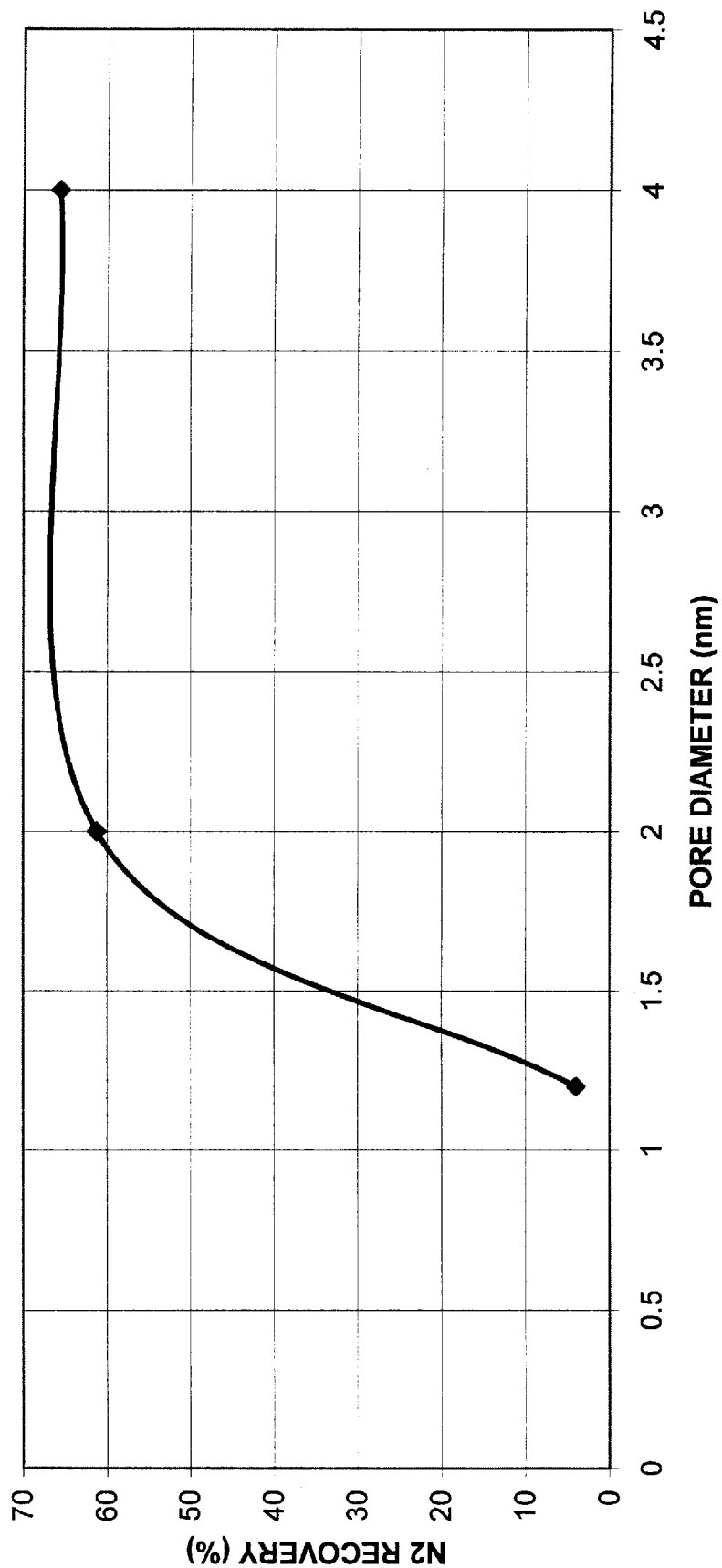

RECOVERY OF OLEFIN MONOMERS

CROSS-REFERENCE TO RELATED APPLICATIONS

This is a continuation of application Ser. No. 09/976,525 filed on Oct. 12, 2001, now abandoned.

STATEMENT REGARDING FEDERALLY SPONSORED RESEARCH OR DEVELOPMENT

This invention was made with government support under Contract No. DE-FC07-00CH110022 between Air Products and Chemicals, Inc. and the US Department of Energy. The Government has certain rights to this invention.

BACKGROUND OF THE INVENTION

The present invention relates to the recovery of olefin monomer from a nitrogen purged degassing step in the manufacture of polyolefin.

Following the polymerisation of olefin such as ethylene or propylene to polyethylene or polypropylene, the polymer contains residual olefin monomer. This is conventionally removed in a degassing step using nitrogen to strip the monomer from the polymer material. The nitrogen purge gas, now contaminated with olefin monomer and other reaction by products or monomer impurities such as ethane and isobutylene and methane, may be flared off or burned with fuel.

U.S. Pat. No. 4,498,910 (Benkmann) discloses a process in which ethylene is reacted to produce ethylene oxide and a purge gas is withdrawn that contains residual ethylene together with a large amount of methane and a smaller proportion of other gases which include oxygen and 'inert gases', which may be argon and nitrogen. The ethylene is recovered by pressure swing adsorption (PSA) using a silica gel adsorbent. The reported recovery of ethylene is about 97%, but the recovery of ethane is only about 62%. There are significant levels of both ethane and ethylene in the residual gas from the PSA. Indeed, most of the ethane appears here and not in the ethylene rich stream.

U.S. Pat. No. 5,245,099 (Mitariten) discloses the recovery by PSA over silica gel of ethylene and heavier components from a hydrocarbon stream which also contains a minor amount of nitrogen. The light cut which is the residual gas from the PSA contains percent levels both of ethylene and of ethane and very large amounts of methane, which like the ethane concentrates there.

U.S. Pat. No. 4,849,537 (Ramachandran) discloses a process for making acrylonitrile from propane by dehydrogenation of the propane to propylene followed by aminoxidation using oxygen enriched air leading to a product stream containing the acrylonitrile from which acrylonitrile is removed as a liquid by quenching. This leaves an off-gas containing propylene which is recovered and recycled by subjecting the off-gas to PSA over silica gel. Once again, the residual gas from the PSA, or light stream, contains percent levels of hydrocarbons, with methane, ethane and ethylene concentrating there.

U.S. Pat. No. 4,781,896 (Wilmore) discloses a polyolefin manufacturing process in which olefin monomer is recovered by de-gassing polyolefin product and is recycled. The recovery is done without the supply of a purge gas and it is remarked that the use of a nitrogen purge stream makes it difficult and expensive to recover the olefin.

U.S. Pat. No. 5,769,927 (Gottschlich) recovers olefin from such a nitrogen purge gas for recycle to the polymerisation by a process of condensation, flash evaporation and membrane separation.

There is a need for an economic method for recovering olefin monomer from olefin polymer using a nitrogen purge gas and recovering the nitrogen without significant olefin content whilst maintaining a sufficient degree of recovery of the nitrogen.

BRIEF SUMMARY OF THE INVENTION

The present invention now provides a process for the production of a polyolefin in which an olefin monomer is polymerised to produce said polyolefin and residual monomer is recovered, said process comprising subjecting a gas stream comprising said monomer and nitrogen to a PSA process in which said monomer is adsorbed on a periodically regenerated solid adsorbent to recover a purified gas stream containing said olefin and a nitrogen rich stream containing no less than 99% nitrogen and containing no less than 50% of the nitrogen content of the gas feed to the PSA process.

The problems of recovery of the olefin from the nitrogen remarked on in Wilmore are overcome by appropriate choice of adsorbent and process conditions and a nitrogen stream is obtained of sufficient purity for reuse or for use elsewhere in the plant, for instance for the pneumatic movement of solids. This is in contrast to the results obtained in other olefin recycling proposals such as those of Benkmann and Ramachandran. In Benkmann a significant amount of ethylene and most of the ethane find their way into the light stream, i.e. the residual gas from the PSA, which in addition to nitrogen contains substantial amounts of oxygen. In Ramachandran, the PSA waste stream contains percent levels of $C_{2+}$ hydrocarbons (i.e. ethane, ethylene and heavier hydrocarbons). Furthermore, the ethane and ethylene, present only in small amounts in this system, actually concentrate in the light stream, i.e. the residual gas from the PSA.

The term "PSA" is used herein to include processes in which regeneration is accomplished essentially by pressure reduction rather than by heat addition and specifically includes VSA (vacuum swing adsorption) processes.

The adsorbent may be silica gel but is preferably alumina of suitable pore size and surface area, on the grounds of price and performance. Preferably then, the adsorbent is alumina having a surface area of no more than 900 m$^2$/g, more preferably no more than 800 m$^2$/g, most preferably no more than 600 m$^2$/g. Where silica gel is used, the surface areas preferred are as given for alumina.

One option is to use a layered bed or a pair of beds in series containing an upstream (with respect to the on-line feed direction of gas flow) silica gel portion and a downstream alumina portion. Adsorption of $C_2H_4$ is characterised by a higher rate of mass transfer or alumina. The linear driving force mass transfer coefficients that match measured breakthrough curves are 0.55 and 0.88 sec$^{-1}$ for alumina and silica gel respectively. Placing the alumina at the product end of the adsorbent bed sharpens the $C_2$ mass transfer zone.

For both silica gel and alumina it is preferred that the alumina has an average pore diameter of at least 1.7 nm, more preferably at least 2.0 nm.

Preferred particle sizes for the adsorbent are 0.25 to 4 mm.

The recovery of $C_{2+}$ hydrocarbons from the monomer and nitrogen containing gas stream is preferably no less than 95%, more preferably no less than 99%. The ratio of ethylene in the monomer and nitrogen gas stream to the ethylene in the nitrogen rich stream is preferably at least 500 and the ratio of ethane in the monomer and nitrogen gas stream to the ethane in the nitrogen rich stream is preferably at least 50.

Preferably, at each stage of the PSA process, breakthrough of C2+hydrocarbons from the adsorbent is avoided.

The PSA process is preferably operated using four beds, generally as described in U.S. Pat. No. 3,430,418, but any number of beds may be employed as known in the art. Feed temperatures are suitably from 5 to 100° C. at pressures of 1 to 20 bara. The beds may be regenerated at lower pressures from 0.1 to 2 bara.

The invention includes apparatus for use in the polymerisation of olefin comprising a polymerisation unit having an inlet for olefin monomer and an outlet for polymer connected to a polymer degassing unit having an inlet for nitrogen purge gas and an outlet for a nitrogen/monomer mixture connected to an olefin recovery unit comprising a compressor feeding said nitrogen/monomer mixture in a compressed state to an inlet of a liquid olefin separator having outlets for liquid olefin and for an olefin depleted nitrogen/olefin mixture, said outlet for liquid olefin being connected to recycle the olefin to the polymerisation unit, and a PSA gas separation unit connected to receive said olefin depleted nitrogen/olefin mixture and to produce therefrom a purified nitrogen stream containing no less than 99% nitrogen and a recovered olefin stream, said PSA unit being connected to return said recovered olefin stream to the inlet of said liquid olefin separator.

BRIEF DESCRIPTION OF SEVERAL VIEWS OF THE DRAWINGS

The invention will be further described and illustrated with reference to the accompanying drawing, in which:

FIG. 3 is a graph of nitrogen recovery against adsorbent average pore size produced in Example 1.

DETAILED DESCRIPTION OF THE INVENTION

Figure 1:
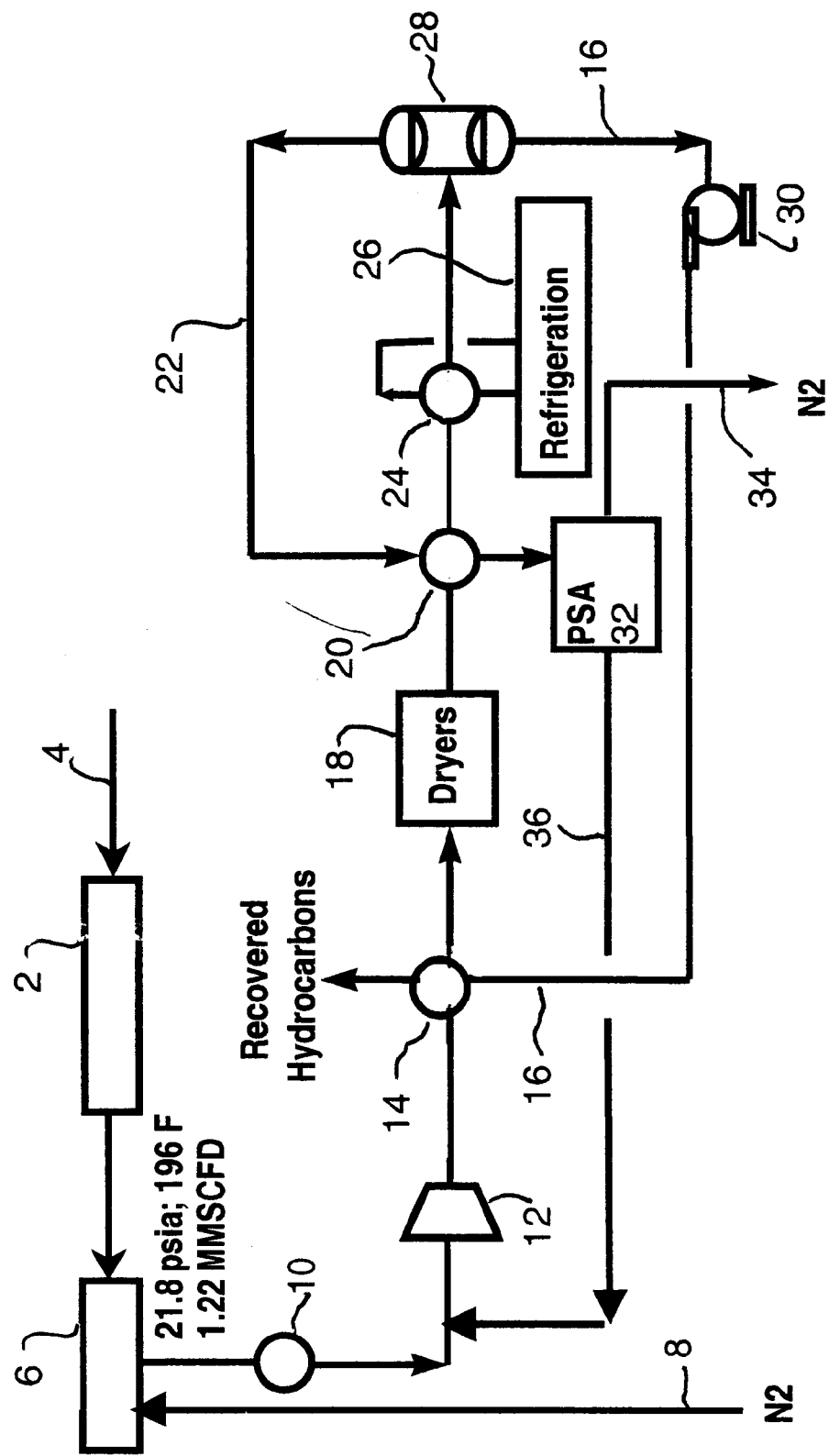
FIG. 1 shows a schematic flow sheet of a monomer recovery and recycle system according to the invention.

As shown in FIG. 1, an olefin polymerisation reactor 2 receives olefin monomer through an inlet 4 and feeds a degassing unit 6 purged by nitrogen introduced via a line 8. Vent gas from the nitrogen purged degassing of the polyolefin is received at an inlet to a cooler 10, is compressed by a compressor 12, is cooled in a heat exchanger 14 against liquefied recovered hydrocarbons in line 16 and is dried in a drier 18. The stream is further cooled in a heat exchanger 20 against olefin containing gas in a line 22 and is still further cooled in heat exchanger 24 against refrigerant in a refrigeration system 26 before passing to a liquid hydrocarbon separator 28 from which liquid hydrocarbon exits through line 16 and is fed to heat exchanger 14 by a pump 30. Gas separated in the separator 28 passes via line 22 and heat exchanger 20 to a PSA separation plant 32 which produces a residual gas stream of essentially pure nitrogen through line 34 and a recycle stream rich in recovered olefin and other hydrocarbons through line 36 which is fed back up stream of the compressor 12.

The PSA system is of conventional construction and has multiple beds of adsorbent which are on-line adsorbing hydrocarbons and are undergoing regeneration in a cyclic manner. A four bed system is used in the following example, but other configurations of more or fewer beds may be used as known in the art.

EXAMPLES

Example 1

A four bed PSA cycle with one pressure equalisation step as described in U.S. Pat. No. 3,430,418, Example 1, is used. The cycle consists of the following steps:

| 1 | Adsorption | 8 minutes |
| 2 | Pressure equalisation | 1 minute |
| 3 | Cocurrent depressurisation | 7 minutes |
| 4 | Countercurrent depressurisation | 1 minute |
| 5 | Purge | 7 minutes |
| 6 | Repressurisation | 8 minutes |

The cocurrent depressurisation effluent gas is sent to the effluent or light cut stream, rather than to another bed. Repressurisation is with nitrogen rather than feed gas. The cocurrent steps(feed, pressure reduction and purge are all stopped prior to $C_2$ breakthrough.

The following parameters are used:

| 1 | Feed pressure | 16 bara (220 psig) |
| 2 | Feed temperature | 27° C. |
| 3 | Feed time | 160 sec |
| 4 | Equalisation and depressurisation | 85 sec |
| 5 | Purge time | 75 sec |
| 6 | Purge pressure | 1.33 bara (4.8 psig) |

The adsorbents evaluated are as shown in the following table:

TABLE 1

| Adsorbent | Surface area | Average pore diameter |
| --- | --- | --- |
| activated alumina | 325 m$^2$/g | 4.0 nm |
| silica gel | 750 m$^2$/g | 2.0 nm |
| Activated carbon | 1200 m$^2$/g | 1.2 nm |

The molar compositions of the feed, effluent (low cut) and recycle (heavy cut) streams are as follows:

TABLE 2

| Component | Feed % | Effluent % | Recycle % |
| --- | --- | --- | --- |
| Nitrogen | 49.5 | 99.9 | 27.7 |
| Ethylene | 30.3 | <0.1 | 43.3 |
| Ethane | 5.4 | <0.1 | 7.7 |
| Isobutane | 14.2 | <0.1 | 20.4 |
| Methane | 0.5 | <0.1 | 0.4 |

The performance of the adsorbents in terms of recovery of nitrogen in the low cut and ethylene in the heavy cut is as follows:

TABLE 3

| Adsorbent | Surface area (m$^2$/g) | N$_2$ recovery % | C$_{2+}$ recovery % |
| --- | --- | --- | --- |
| Alumina | 325 | 65.6 | 99.4 |
| Silica gel | 750 | 61.2 | 99.6 |
| Activated carbon | 1200 | 4 | 99.0 |

Figure 2:
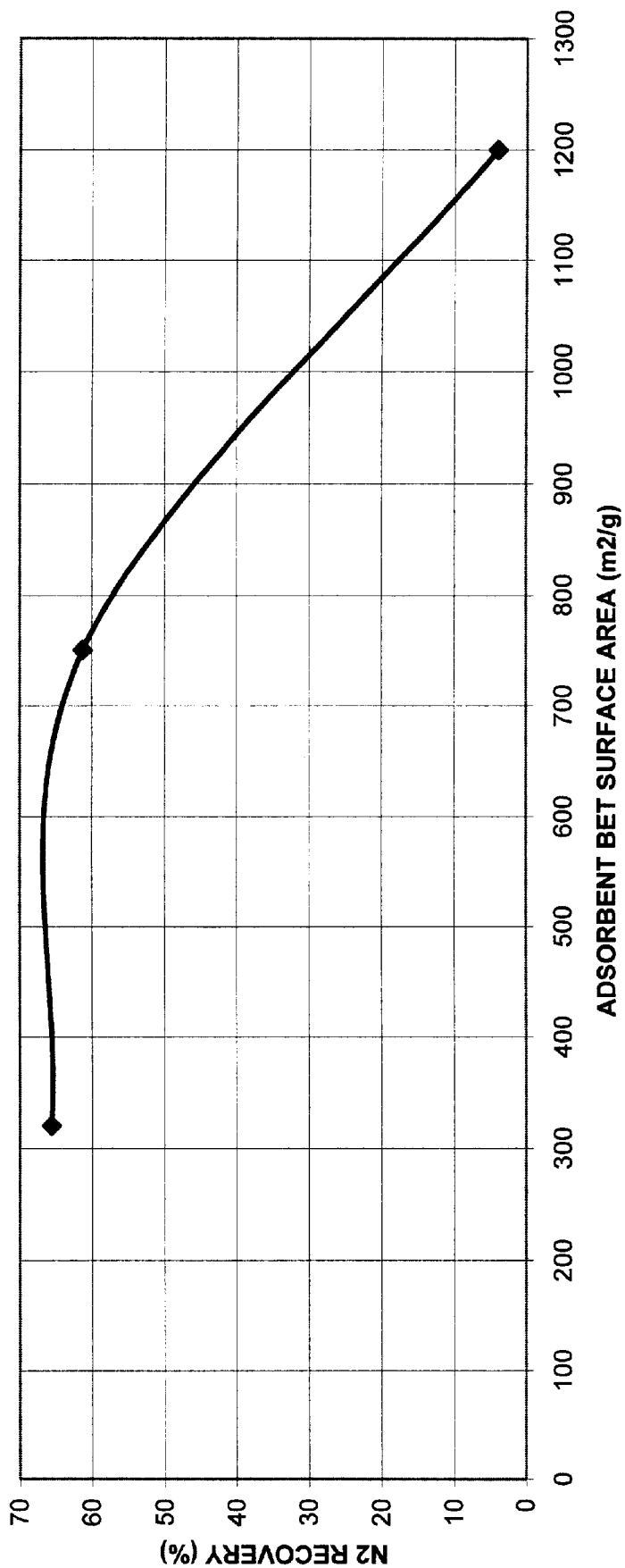
FIG. 2 is a graph of nitrogen recovery against adsorbent surface area produced in Example 1.

Plots of the nitrogen recovery against adsorbent specific surface area and pore size are shown in FIGS. 2 and 3 respectively.

In general, adsorbents with high selectivity are desired for adsorption processes. The following Table shows the Henry's Law constants (initial isotherm slope) and Henry's Law ethane/nitrogen selectivity (ratio of Henry's Law constants) for various adsorbents at 30° C.

TABLE 4

| Adsorbent | Average pore diameter | (mmole/g/atm) K $N_2$ | (mmole/g/atm) K $C_2H_6$ | S $C_2H_6/N_2$ |
| --- | --- | --- | --- | --- |
| Alumina | 4.0 | 0.019 | 0.30 | 15.8 |
| Silica gel | 2.0 | 0.054 | 0.94 | 17.4 |
| Activated carbon | 1.2 | 0.44 | 29.7 | 67.5 |
| 13X zeolite | 1.0 | 0.20 | 5.8 | 29.0 |

The results show that adsorbents with average pore diameters less than 2.0 nm have high selectivity for ethane over nitrogen. Unexpectedly, these high selectivity adsorbents are not preferred for nitrogen recovery from $C_{2+}$ hydrocarbon containing streams.

Whilst the invention has been described with particular reference to the preferred embodiments thereof, it will be appreciated that many modifications and variations are possible within the scope of the invention.

What is claimed is:

1. A process for the production of a polyolefin in which an olefin monomer is polymerized to produce said polyolefin and residual monomer is recovered, said process comprising subjecting a gas stream comprising said monomer and nitrogen to a pressure swing adsorption (PSA) process in which said monomer is adsorbed on a periodically regenerated solid adsorbent to recover a purified gas stream containing said olefin and a nitrogen rich stream containing no less than 99% nitrogen and containing no less than 50% of the nitrogen content of the gas feed to the PSA process and wherein the recovery of $C_2^+$ hydrocarbons from the monomer and nitrogen containing gas stream no less than 90%.

2. A process as claimed in claim 1, wherein the adsorbent is silica gel.

3. A process as claimed in claim 1, wherein the adsorbent is alumina having a surface area of no more than 900 $m^2/g$.

4. A process as claimed in claim 1, wherein the adsorbent is alumina having a surface area of no more than 800 $m^2/g$.

5. A process as claimed in claim 1, wherein the adsorbent is alumina having a surface area of no more than 600 $m^2/g$.

6. A process as claimed in claim 1, wherein the adsorbent is alumina having an average pore diameter of at least 1.7 nm.

7. A process as claimed in claim 1, wherein the adsorbent is alumina having an average pore diameter of at least 2.0 nm.

8. A process as claimed in claim 1, wherein at each stage of the PSA process, breakthrough of $C_{2+}$ hydrocarbons from the adsorbent is avoided.

9. A process as claimed in claim 1, wherein the ratio of ethylene in the monomer and nitrogen gas stream to the ethylene in the nitrogen rich stream is at least 500.

10. A process as claimed in claim 1, wherein the ratio of ethane in the monomer and nitrogen gas stream to the ethane in the nitrogen rich stream is at least 50.

11. Apparatus for use in the polymerization of olefin comprising a polymerization unit having an inlet for olefin monomer and an outlet for polymer connected to a polymer degassing unit having an inlet for nitrogen purge gas and an outlet for a nitrogen/monomer mixture connected to an olefin recovery unit comprising a compressor feeding said nitrogen/monomer mixture in a compressed state to an inlet of a liquid olefin separator having outlets for liquid olefin and for an olefin depleted nitrogen/olefin mixture, said outlet for liquid olefin being connected to recycle the olefin to the polymerization unit, and a pressure swing adsorption (PSA) gas separation unit connected to receive said olefin depleted nitrogen/olefin mixture and to produce therefrom a purified nitrogen stream containing no less than 99% nitrogen and a recovered olefin stream, said PSA unit having a recovery of $C_2^+$ hydrocarbons from the monomer and nitrogen containing gas stream of no less than 99% and being connected to return said recovered olefin stream to the inlet of said liquid olefin separator.

* * * * *

UNITED STATES PATENT AND TRADEMARK OFFICE
CERTIFICATE OF CORRECTION

PATENT NO. : 6,706,857 B2
DATED : March 16, 2004
INVENTOR(S) : Golden et al.

It is certified that error appears in the above-identified patent and that said Letters Patent is hereby corrected as shown below:

Column 5,
Line 37, delete "90%" and replace with -- 99% --.

Signed and Sealed this

Twenty-ninth Day of June, 2004

JON W. DUDAS
*Acting Director of the United States Patent and Trademark Office*